C. W. SALADEE.
Vehicle-Springs

No. 146,100. Patented Dec. 30, 1873.

WITNESSES: INVENTOR.

UNITED STATES PATENT OFFICE.

CYRUS W. SALADEE, OF PITTSBURG, PENNSYLVANIA.

IMPROVEMENT IN VEHICLE-SPRINGS.

Specification forming part of Letters Patent No. 146,100, dated December 30, 1873; application filed May 1, 1873.

*To all whom it may concern:*

Be it known that I, CYRUS W. SALADEE, of Pittsburg, in the State of Pennsylvania, have invented certain Improvements in Compound Scroll or Spiral Springs, of which the following is a specification, embodying my invention.

The nature of my invention consists in placing together two or more thin plates, rods, or strands of steel, and then bend the whole in one mass, by a single operation, into the form of a scroll or spiral spring; and has for its object the production of this class of springs, that shall be softer and more elastic in their operation than if made of a single piece or plate of steel in the old way; and it is my purpose to apply springs so formed to any and every use where they may be found desirable, but more particularly to all classes of wheeled vehicles.

Figure 1:
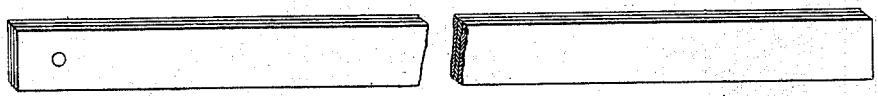
Figure 2:
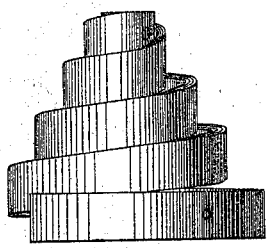
Figure 3:
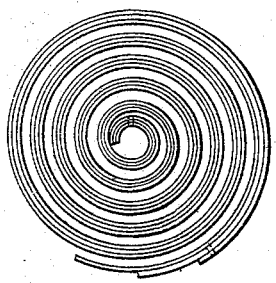

In the drawings, Figure 1 represents an edge view of three plates of steel laid together before they are bent into form, and secured together at one end by means of a rivet, so as to firmly hold them in their relative position to each other while going through the process of bending. Fig. 2 represents the same plates bent into the form of a spiral spring from a side elevation, and Fig. 3 is a side elevation of a scroll-spring made up of the plates seen in Fig. 1.

These springs, under any of the modifications they are susceptible of, are to be provided with suitable bearings or casings, upon or in which to operate them, as the case may require, in any of the well-known methods of doing the same.

The principal advantages claimed for this manner of compounding the several plates to form the complete spring, as herein described, over all similar springs is, that each separate plate, being independent of the others, and not welded to them at the end or ends, any one of the plates, upon being broken, may be removed and a new one substituted, whereas if the ends of the plates were welded together before the spring is bent into form, and one of the plates were fractured, the whole spring would be rendered worthless, as the fractured plate could not be repaired or replaced.

I claim—

A compound spiral spring composed of two or more plates, rods, or bands riveted together at or near their ends and bent into form, substantially as described.

CYRUS W. SALADEE.

Witnesses:
FRANCIS TORRANCE,
N. B. HATCH.